Oct. 22, 1957  W. E. BROWN ET AL  2,810,794
HEADLIGHT CONTROL SWITCH
Filed May 19, 1954  3 Sheets-Sheet 1
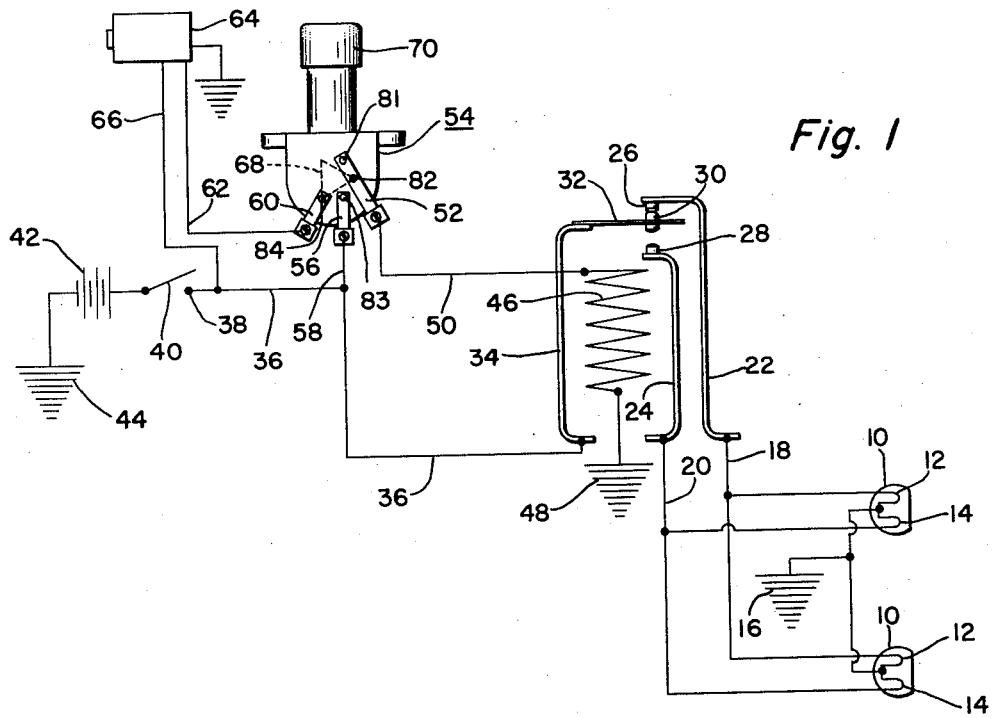
Fig. 1
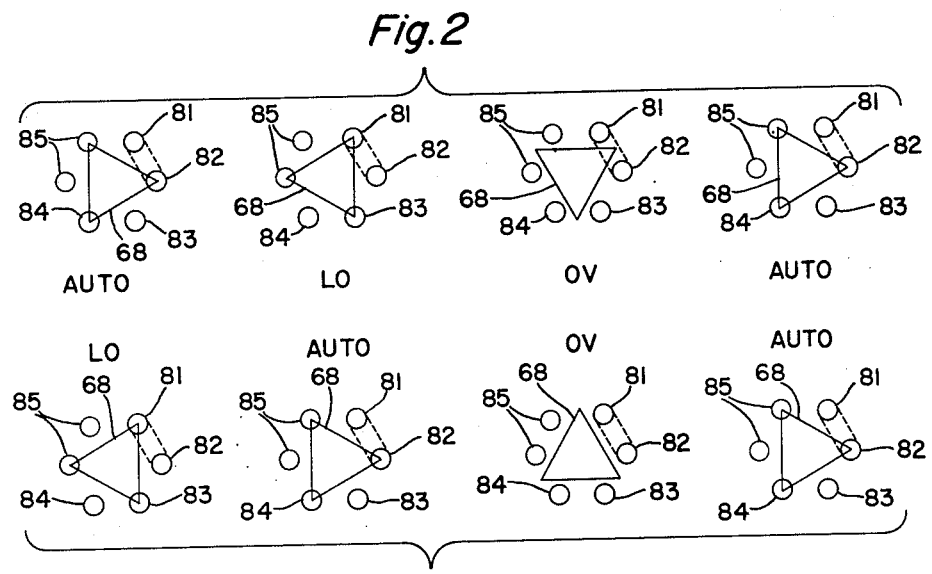
Fig. 2
Fig. 3
INVENTORS
William E. Brown
Harold V. Elliott
BY
Their Attorney Oct. 22, 1957 W. E. BROWN ET AL 2,810,794
HEADLIGHT CONTROL SWITCH
Filed May 19, 1954 3 Sheets-Sheet 2

INVENTORS
William E. Brown
Harold V. Elliott
Their Attorney

Oct. 22, 1957 W. E. BROWN ET AL 2,810,794
HEADLIGHT CONTROL SWITCH
Filed May 19, 1954 3 Sheets-Sheet 3
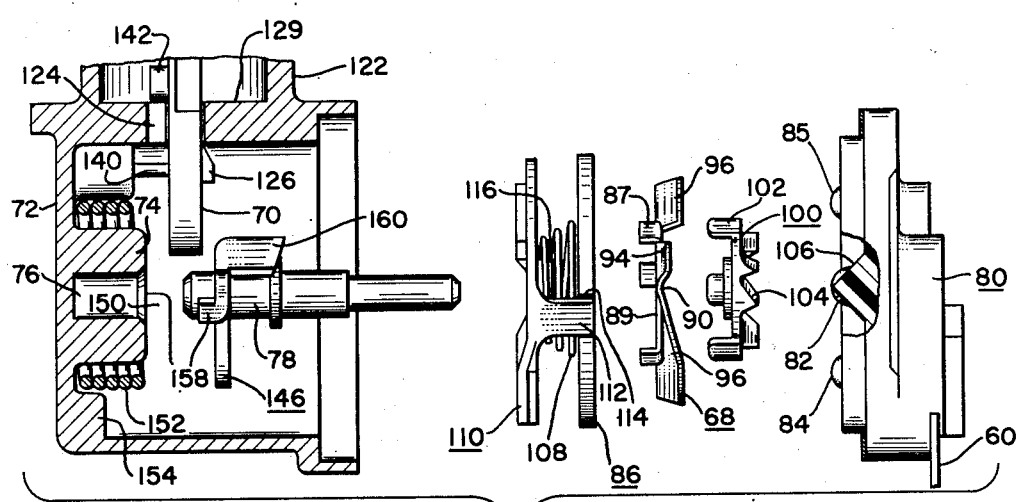
Fig. 8
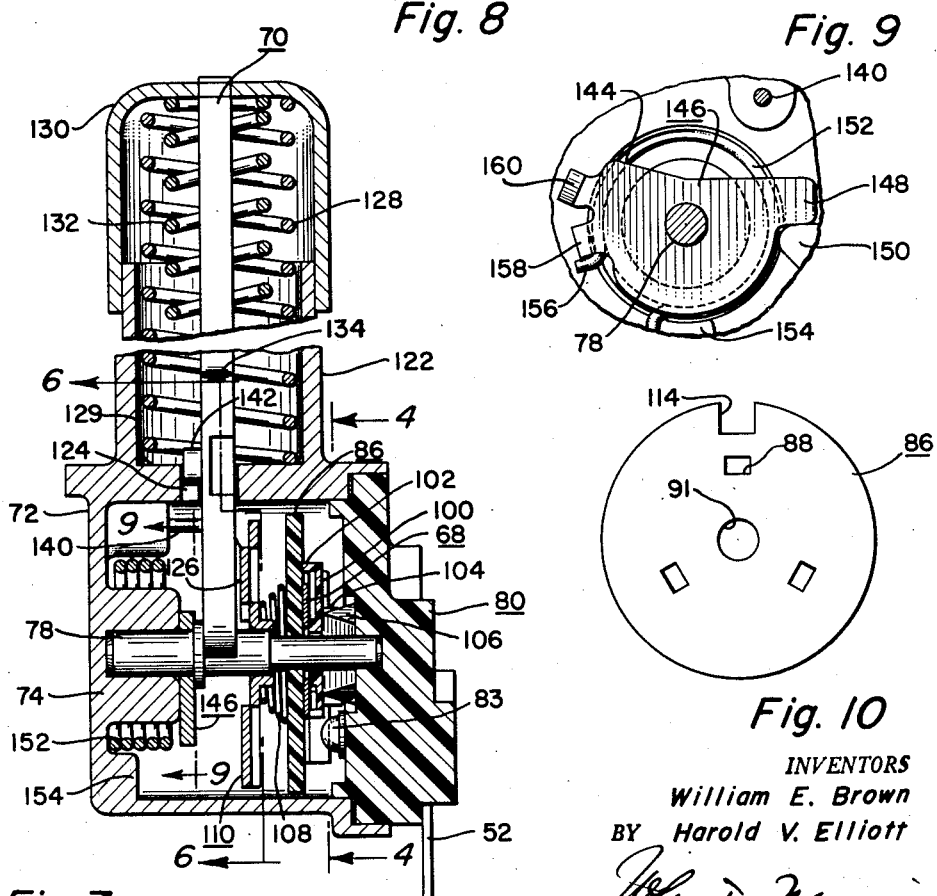
Fig. 9
Fig. 7
Fig. 10
INVENTORS
William E. Brown
BY Harold V. Elliott
Their Attorney

United States Patent Office 2,810,794
Patented Oct. 22, 1957

2,810,794

HEADLIGHT CONTROL SWITCH

William E. Brown and Harold V. Elliott, Anderson, Ind., assignors to General Motors Corporation, Detroit, Mich., a corporation of Delaware Application May 19, 1954, Serial No. 430,840

10 Claims. (Cl. 200—6)

This invention relates to headlight controls for motor vehicles and more particularly concerns a means and a system for automatically dimming the headlights when another vehicle approaches so as to reduce the glare in the face of the oncoming driver and a manually operable means for overcoming the automatic dimming means for signalling and other purposes.

It is an object of the present invention to provide a foot dimmer switch and circuit therefor which will selectively control circuits for placing the headlamps of a vehicle in a preselected beam position or in an automatic position wherein the lamps are in either high or low beam positions depending on certain conditions, and wherein the switch will modify the above circuit, when desired, for placing said lamps in another beam position for signalling and other purposes.

It is a further object of the present invention to provide a foot dimmer switch for controlling circuits which will selectively place the headlamps of a vehicle in either a low beam circuit or under the control of a device which will circuit the lamps in either a high or low beam position depending on certain conditions, said switch being adapted to control or modify the above controlled circuits so that the lamps will be in a high beam position for signalling and other purposes.

With this understanding high and low beam may be synonymous with bright and dim beams. The improvement consists in providing a connection between headlamps and the battery that gives the high beam circuit when all the control elements are at rest and connected with the battery, so that to get a low beam circuit something must be done to alter that circuit. In the present instance a power relay has a spring flexed armature which closes back contacts by which the high beam of the headlamp is directly connected to the current source whenever the light switch is closed. A magnetizing coil of the power relay is operable to shift the armature to engage a front contact for opening high beam circuit and for closing the low beam circuit. The energizing coil is connected to a selecting switch which is capable of alternately establishing either of two circuits, one of which connects the power relay coil directly with the current source, and the second of which connects the coil of the power relay with a light sensitive unit such as an electric eye. In the first instance, the coil of the power relay establishes a continuously burning low beam circuit, and in the second instance, where the coil of the power relay is connected with light sensitive unit, there is established a high beam circuit subject to change to a low beam circuit in the presence of an approaching vehicle with its headlights burning. In the event that the headlights of the approaching vehicle have a brightness above a recognized degree, the light sensitive unit is so energized as to effect connection of the coil in the power relay, whereupon the armature shifts to interrupt the high beam circuit and close the low beam circuit.

Thus the selecting switch has a "low" position and an "auto" position each in establishing the respective foregoing circuits. The selecting switch is of such character and design as to have a rotating bridging contact operable by a linearly movable plunger that travels from a rest position through a range of movement to a second position for rotating the contact assembly one step, and is also movable to a third or override position in which the energizing circuit for the power relay opens allowing the armature to reestablish the normal high beam circuit. Each depressing movement of the plunger through the first range of movement, or each movement of the plunger through a short stroke, changes the circuit connected to the selecting switch from "low" to "auto" position or vice versa, and each full stroke of the plunger through the second range of movement or to the override position results in setting the selecting switch in the "auto" position. This makes it possible, when the system is set for control by the light sensitive unit, to maintain the high beam despite the operation of the control unit operating to set up the low beam circuit.

Further objects and advantages of the present invention will be apparent from the following description, reference being had to the accompanying drawings wherein a preferred embodiment of the present invention is clearly shown.

In the drawings:

Fig. 1 is a circuit diagram illustrating the lighting control system of the present invention.

Fig. 2 is a schematic showing of various positions of a circuit controlling means when the cycle of movement starts from the "auto" position.

Fig. 3 is similar to Fig. 4 showing the controlling means as starting from a "low" position.

Figure 4:
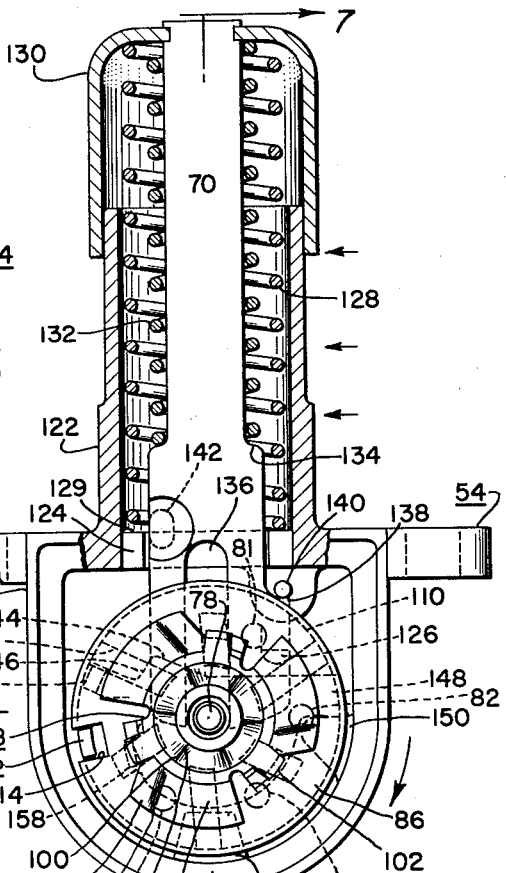

Fig. 4 partly in section is a view along line 4—4 of Fig. 7.

Figure 5:
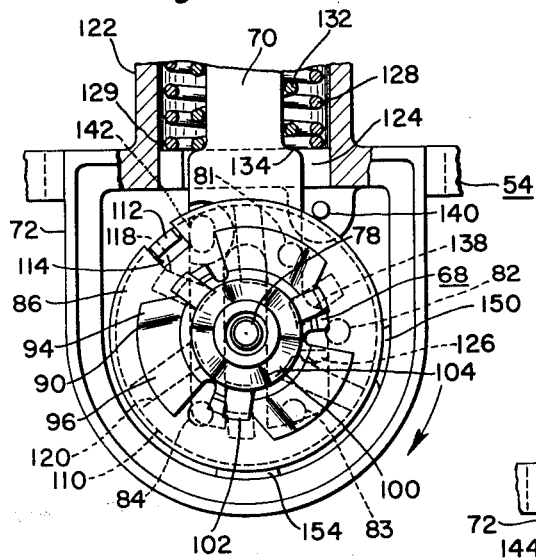

Fig. 5 is a fragmentary view partly in section illustrating the parts of the switch in a "low" position.

Figure 6:
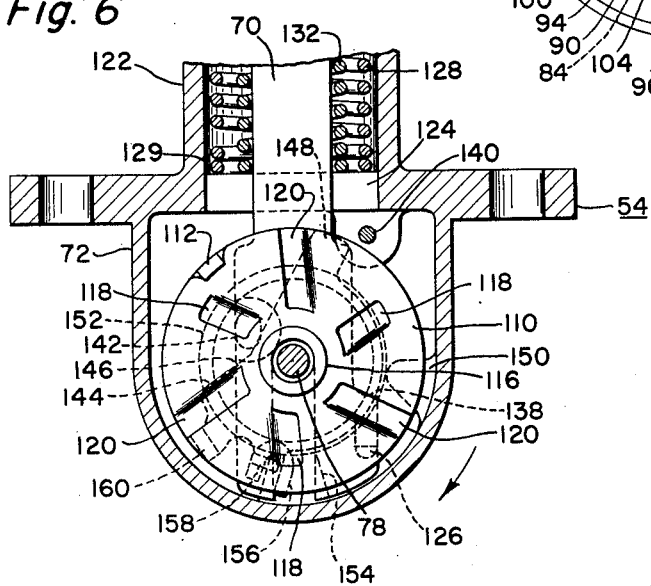

Fig. 6 partly in section is a view taken along line 6—6 of Fig. 7.

Fig. 7 is a partial sectional view along line 7—7 in Fig. 4.

Fig. 8 is an exploded view of certain parts of the selecting switch taken in the direction of arrow 8, in Fig. 4.

Fig. 9 is a fragmentary view along line 9—9 of Fig. 7.

Fig. 10 is a plan view of a rotatable driving disc that insulates the contact disc from various driving component parts of the switch.

With reference to the drawings, and particularly to Fig. 1, numeral 10 indicates headlamps, each having a "high" beam filament 12 and a "low" beam filament 14 grounded at 16, and connected by wires 18 and 20, respectively, to straps 22 and 24 of a relay that carries contacts 26 and 28 that are spaced for alternate engagement by a contact 30 mounted on an armature 32 that is hingedly supported on a magnet frame 34, which is connected by a lead 36 through a terminal 38 on switch 40 to a battery 42 that is grounded at 44.

The energizing coil 46 of the power relay is grounded at 48 and is connected by a wire 50 with a terminal strip 52 of a selecting switch 54. A second terminal strip 56 of switch 54 is connected by a wire 58 with the lead 36. A third terminal strip 60 of the switch 54 is connected by a wire 62 with a diagrammatically shown "autronic" eye of a light sensitive control unit 64 that may be energized in any conventional manner as through wire 66 or the like.

The selecting switch 54 embodies a movable contact or bridging member 68 that is actuated by a plunger 70 for alternately connecting the terminal strips 56 or 60 with terminal strip 52. When the movable contact 68 bridges the terminal strips 52 and 56 the selective switch is set for the "low" beam circuit, and when the bridging member engages terminal strips 52 and 60 the selective switch is set for "auto" as is illustrated in the dotted lines in Fig. 1.

It should be observed that whenever the coil 46 is not energized contacts 26 and 30 are closed and then the "high" beam circuit is connected between ground 16 and battery 42, that circuit being traced from filament 12, wire 18, strap 22, contacts 26 and 30, armature 32, frame 34, wire 36, contact 38, switch blade 40, battery 42 and through ground 44. Any energization of coil 46 shifts the armature 32, will break the engagement between contacts 26 and 30 and make the engagement between contacts 28 and 30 to thereby open the high beam circuit close the low beam circuit. Manual actuation of the selecting switch 54 establishes either a continuous low beam circuit when the coil 46 is energized by connection with straps 52, 56, or establishes an automatic circuit over 52, 60 and thence to the light sensitive unit 64.

The selecting switch 54 is shown to the best advantage in Fig. 8, where a housing 72 has a boss 74 recessed at 76 to receive one end of a shaft 78. The other end of the shaft 78 is journaled in a recess in a terminal block 80, which also closes the open side of the housing 72, as in Fig. 7, and supports the terminal straps 52, 56 and 60. The strap 52 is secured to the block 80 by rivets 81 and 82, strip 56 is attached to the block 80 by a rivet 83, and strip 60 is fixed to the block 80 by a rivet 84. Each rivet has a rounded head located on the inner face of the block 80 which provide contacts surfaces for the switch. The inner face of the block 80 carries two spherical bosses 85 that are arranged relative to rivet contacts 81, 82, 83, 84 in a circular row so as to provide six positions over which the movable contact member 68 can pass when rotated by the normal depression of the plunger 70.

The rotatable contact 68 is driven by a nonconducting disc 86 through driving tangs 87 which extend into openings 88 in disc 86 that are concentric with a central opening 91 through which the shaft 78 extends. The contact 68 also has three radially disposed arms 89 each of which is deformed to provide three circumferentially spaced grooves 90 that are adapted to engage the spherical heads of contacts 81, 82, 83, 84 and the spherical bosses 85 and thereby yieldably restrain backward movement of the movable contact 68. The movable contact 68 is also formed with short inclined portions 94 and long inclined portions 96 permitting one-way movement, or step-like action, of the grooves 90 in the movable contact 68 as the contact element cams over the stationary contacts 81, 82, 83, 84 and the bosses 85 carried by the terminal block 80.

Disposed between the contact disc 68 and terminal block 80 there is a cam member 100, of nylon or other nonconducting material, which is rotatable on the shaft 78 and driven by the disc 86 indirectly through its engagement of legs 102 against the edges of short inclined portions 94 substantially as shown in Figs. 4 and 5. On the opposite face of the member 100 a series of circularly disposed cam faces 104 are located so as to be engageable with three circularly spaced cam portions 106 centrally located on terminal block 80 so that each rotary stepped movement of the contact assembly 68 will cause a sufficient axial camming movement between movable contact 68 and terminal block 80 to cause separation between contact plate 68 and certain fixed contacts on terminal block 80, before contact is reestablished between contact 68 and other of the fixed contacts as the camming action is completed between the parts.

A conical spring 108 normally urges the contact assembly axially of the shaft so that contacts 81, 82, 83 and 84, or some of them, will be engaged by the grooves 90 in the contactor 68. This spring 108 is disposed between the contact supporting disc 86 and a ratchet wheel 110 that has an axially extending tongue or lug that is received in a notch 114 as formed in the periphery of the disc 86. On the opposite side of the driving tongue 112, the ratchet wheel 110 has a circular series of ratchet teeth equiangularly spaced about a hub 116 which consist of three radially spaced short teeth 118 that are alternately spaced between three radially spaced longer teeth 120 as in Figure 6.

Housed within a cylindrical portion 122 of housing 72, a plunger 70 is movable through an opening 124 to rotate the ratchet wheel 110 when an abutment 126 selectively engages one or another of the teeth 118 and 120 so that the step by step action of the contact 68 is accomplished as heretofore described. The plunger 70 is maintained in the position shown in Fig. 4 by a spring 128 that has one end seated against a wall 129 of the housing, through which opening 124 extends, and the other end engaging the inside of a cap 130 secured on the opposite end of the plunger 70. A second spring 132 has one end seated against a shoulder 134 on plunger 70 and has the other end seated against the inside of the cap 130. The end of the plunger 70 remote from cap 130, is bifurcated to a sufficient depth as at 136 so as to embrace shaft 78 and allow a full depression of the plunger 70 from a rest position shown in Fig. 4 throughout the first range of movement to a second position shown in Fig. 5 and to a third position shown in Fig. 6. The spring 128 normally holds the plunger 70 in the position shown in Fig. 4 where a ledge or shoulder 138 on plunger 70 abuts a stop pin 140 anchored in the housing 72. When the plunger 70 is depressed to the second position, shown in Fig. 5, the lower end of spring 132 abuts a portion of the wall 129 and thereby increases the resistance against further depression of the plunger 70.

When the plunger is depressed to the second position, abutment 126 will engage either of teeth 118 or 120, and the wheel 110 and will be rotated through one of the angular spaces between the contacts 81, 82, 83 and 84. Thus, the step-like rotation of the contact assembly is accomplished by a short stroke of the plunger, and the contact assembly is shifted alternately from the low to the automatic positions or vice versa as has been described with respect to Fig. 1.

The plunger 70 also has a boss 142 on the side opposite from abutment 126, which is adapted upon further depression of the plunger 70 to the third position, to engage a lug portion 144 of a drag plate 146 that is rotatable about the shaft 78. The drag plate 146 has a stop arm 148 that is normally urged against a boss 150 that is integrally formed on the inside of the housing 72 by a torque spring 152. This torque spring 152 has one end positioned against a boss 154 also formed on the inside of the housing 70 and is coiled about the boss 74 and has its other end in position against a lug 158 as formed on arm 58 located on the drag plate 146. The drag plate 146 is also formed with a drag tooth 160 that extends toward the ratchet wheel 110 and is adapted to cooperate with the longer teeth 120 only when the full stroke of plunger 70 from position two to position three is accomplished.

With these provisions the selecting switch 54 is capable of controlling the headlight system in the manner described, and as graphically illustrated in Figs. 2 and 3. Successive short strokes of the plunger from position one to position two will alternately effect a low beam or a high beam circuit as changed by the single stepped rotation of the contactor 68. This will accomplish the conventional manual light control. However, when the selecting switch 54 is in the "auto" position the lighting system is subject to automatic dimming by means of the light sensitive unit 64. In that position, should an oncoming light beam of sufficient intensity strike the photoelectric portions of unit 64, the coil 46 will be energized and the armature 32 will shift and maintain the low beam filament in circuit as long as sufficient light is present to sensitize the automatic dimming device 64. When the switch 54 is in the low beam setting, contactor 68, shown in the form of a triangle in Fig. 3, engages contacts 81 and 83 and thus connects the coil 46 directly to the battery 42 and thereby constantly maintains the low beam filament in circuit. A short stroke of the plunger 70 rotates the contact 68 to the "auto" position shown in the next stage 68 in Fig. 3 so that either the high or low beam filaments will be energized depending upon the energization of relay coil 46.

From the above, it is manifest that the switch 54, the parts of which have been heretofore described, in combination with the light sensitive unit 64, will selectively actuate the coil 46 of the relay unit so that either the high or low beam filaments are in circuit with battery 42. This result is accomplished by depressing plunger 70 and thereby rotating the contactor 68 to the various positions relative to the contacts carried by block 80 as shown in Figures 2 and 3. When plunger 70 is depressed from the position shown in Fig. 4 to the position shown in Fig. 5, lug 126 formed on plunger 70 will engage the longer lugs 120 on wheel 110 and thereby rotate the wheel clockwise over a 1/6 revolution and thereby rotate the contact on disc 68 from the "auto" to the low position. When the plunger is further depressed from the position shown in Fig. 5 to the position shown in Fig. 6 an increased resistance will be imparted thereto as spring 132 engages wall 129 and lug 126 will continue in its travel and thereby rotate the wheel 110 an additional 1/12 of a turn so that the contact 68 will move clockwise to the override position "ov" as shown in Figure 2. During the travel of the plunger from the position shown in Figure 5 to that shown in Figure 6, the lug 142 on plunger 70 will ride on surface 144 on drag link 146 and rotate the link 146 in a counterclockwise direction against the action of torsion spring 152. This rotation of drag link 146 will cause the lug 160 to ride over the inclined surface of one of the longer teeth 120 as the longer teeth, because of the arrangement of the various parts of the switch, will be in the path of travel of the lug 142. When the depressing pressure on plunger 70 is released, drag link 146 will tend to rotate in a clockwise direction because of the action of spring 152 so that lug 160 will engage behind the tooth 120, as shown in phantom in Fig. 6, and thereby further cause wheel 110 to be rotated clockwise another 1/12 turn so that the contact 68 will be moved to the auto position as shown in Fig. 2.

When the cycle of switch operation is started from the low beam position as in Fig. 3, lug 126 will engage one of the shorter teeth 118 on wheel 110 and cause the contact 68 to be moved to the auto position. When the plunger 70 is depressed to the override position, shown in Fig. 6, lug 126 on plunger 60 will continue in contact with the shorter tooth 118 and further rotate the wheel 110 and contact 68 clockwise 1/12 of a turn so as to position the parts in the override position shown in Fig. 3. During the overriding portion of the cycle, lug 142 will move drag link 146 so that lug 160 likewise will move. Lugs 160 because the parts are so oriented, will pass beyond the peripheral portions of tooth 118 and thus, after the parts are in the override position and the depressing pressure is released on plunger 170, the contact 68 returns in a counterclockwise direction of rotation to the auto position as shown in Fig. 3, instead of being kicked forward clockwise an extra 1/12 turn as accomplished when the parts are moved from the low through the override to the automatic position.

From the above arrangement of parts, it is apparent that whenever the plunger is depressed, parts 110, 86, 68, and 100 will be rotated in a clockwise direction when viewed from the block 80 end of the switch. This rotation will cause the cam surfaces 104 on part 100 to ride over the cam surface 106 on block 80 and cause parts 100, 68 and 86 to axially move against the pressure of spring 108 and cause contact 68 to move out of contacting relation with the various contacts located on housing 80. Thus, when the switch is changed from the "auto" to the low or vice versa, a momentary separation of contacts is realized. This action is so rapid, however, that it is not discernible to the naked eye. When, however, the parts are placed in the override position, the lugs 104 are maintained in camming relation with lug 106 and the parts are caused to remain axially separated so that contact between contact 68 and the contacts in block 80 is broken as long as pressure is maintained upon the plunger 70. This will cause relay 46 to be shorted from the circuit and thereby cause the lights to be placed in high beam as previously indicated.

From the above arrangement of parts, it is evident that whenever the override position "ov" is used, the switch will cause the circuit through the automatic to be established. Manifestly, if desired, the lugs on wheel 110 may be all of the same length as lugs 120 to provide a switch wherein a full depression of the plunger would cause the parts thereof to rotate through a complete cycle and always return to the original setting after the override position is used. Thus, if the switch is initially in the low setting, a full depression of the plunger would cause the low setting to be reestablished after the depressing force on the plunger is released.

While the embodiment of the present invention as herein disclosed, constitutes a preferred form, it is to be understood that other forms might be adopted.

What is claimed is as follows:

1. A selecting switch, comprising; a terminal block providing a plurality of circumferentially spaced contacts and abutments, a contact assembly rotatable over the terminal block and having a plurality of circumferentially spaced contact portions arranged for step like engagement with the contacts and abutments, a driving plate supporting said contact member for rotatable motion over the contacts and abutments on said terminal block, a ratchet wheel for moving the driving plate, a plunger operable to rotate said ratchet wheel in response to a first range of plunger movement, a drag plate engageable by said plunger at the end of said first range of plunger movement and rotatable with respect to said ratchet wheel through a second range of plunger movement, a torque spring operative upon the drag plate to resist such movement, and means on said drag plate engageable with the ratchet wheel at the end of the second range of plunger movement and cooperating therewith for rotating the ratchet wheel during the return movement of the plunger.

2. A selecting switch comprising in combination; a terminal block supporting a plurality of circumferentially spaced fixed contacts and abutments, a rotatable bridging member adapted to be rotated to selectively bridge certain of said contacts, means for rotating the bridging contact with respect to the fixed contacts with a step-like motion, means engageable when said bridging member is rotatably moved for disengaging the bridging member from the contacts for each step of rotary movement, a ratchet wheel for driving the bridging member, a spring pressed plunger movable to a first position for advancing said ratchet wheel through one step of rotary movement and movable to a second position for energizing a drag plate, a cam means on the drag plate operable to engage said ratchet wheel at the second position of said plunger for advancing said ratchet wheel a second step upon return of the plunger from the said second position, whereby a short stroke of said plunger advances the bridging contact through one step of rotation and the return of said plunger from the second stroke advances the bridging member an additional step.

3. The combination set forth in claim 2 wherein the ratchet wheel for rotating the bridging member over the contacts has a circular series of radially extending ratchet teeth with alternate teeth having greater radial extensions than the intervening teeth, and the plunger has a driving lug engageable with each of the ratchet teeth for rotating the ratchet wheel throughout the angular spacing between two of said ratchet teeth when said plunger is depressed to said first position.

4. A switch for use with a lighting circuit of a vehicle, comprising; a housing, a plurality of spaced fixed contacts carried by said housing, a movable contact carried within said housing adapted to selectively and normally engage certain contacts of said spaced fixed contacts, a means including a plunger operatively connected with said movable contact and adapted to reciprocally move a predetermined distance to a first position for moving said movable contact in a step by step movement relative to said fixed contacts and means associated with said plunger means and said movable contact for moving said movable contact out of engagement with said fixed contacts only when said plunger is moved a distance greater than said predetermined distance to a second position.

5. A switch for use with a lighting circuit of a vehicle, comprising; a housing, a plurality of fixed contacts carried by said housing, a movable contact rotatably carried within said housing, said rotatable contact being adapted to rotate and engage certain contacts of said fixed contacts, a means including a plunger operatively connected with said rotatable contact and adapted to reciprocally move relative to said housing a predetermined distance for rotating said rotatable contact in a stepped rotative movement in one direction of rotation relative to said fixed contacts, means associated with said plunger and said movable contact for moving said movable contact in said one direction of rotation and out of engagement with said fixed contacts when said plunger is moved a distance greater than said predetermined distance, and means adapted to selectively move said rotatable contact in either direction of rotation when said plunger is moved from said greater to said predetermined distance.

6. In a selecting switch the combination comprising; a terminal block supporting a plurality of circumferentially spaced fixed contacts, a rotatable member adapted to bridge at least a pair of said contacts, a means including a plunger operably connected with said member for rotating said member step by step in one direction and into bridging relation with another pair of said contacts when said plunger is depressed a predetermined distance, and means operably connected with said plunger adapted to rotate said member out of engagement with all of said contacts only when said plunger is further depressed and moved beyond said distance.

7. In a selecting switch the combination comprising; a terminal block supporting at least three of circumferentially spaced fixed contacts, a rotatable member adapted in one position of rotation to bridge at least one pair of said contacts, a means including a plunger operably connected with said member step by step for rotating said member in one direction of rotation into bridging relation with another pair of said contacts when said plunger is depressed in one direction a predetermined distance, and a second means operably connected with said first means for moving said member out of bridging relation with all of said contacts only when said plunger is further depressed in said direction beyond said predetermined distance.

8. In a selecting switch, the combination comprising; a terminal block supporting a plurality of fixed circumferentially spaced abutments, fixed contacts and a cam surface, a rotatable member adapted in one position to bridge a certain pair of said contacts, a ratchet means including a reciprocal plunger operably connected with said member for rotating said member in one direction into bridging relation with another pair of said contacts when said plunger is moved in one direction a predetermined distance and a second means including a part having cam surfaces positioned between said member and terminal block operatively connected with said rotatable member for moving said member out of bridging relation with said contacts when the plunger is moved in said direction beyond said predetermined distance and the cam surfaces on said part engage a cam surface on said terminal block.

9. In a selecting switch, the combination comprising; a terminal block supporting a plurality of circumferentially spaced fixed contacts and abutments, a rotatable member adapted in one position to bridge a certain pair of said contacts, a ratchet means including a reciprocal plunger operably connected with said member for moving said member in one direction of rotation into bridging relation with another pair of fixed contacts when said plunger is moved in one direction a predetermined distance from a normal position and a second means operably connected with said first means for moving said member out of bridging relation with said contacts when said plunger is moved in said direction beyond said predetermined distance, said second mentioned means being adapted to rotate said bridging member in either direction of rotation when said plunger is moved in the opposite direction toward said normal position.

10. In a selecting switch, the combination comprising; a terminal block supporting a plurality of circumferentially spaced fixed contacts and abutments, a rotatable member adapted in one position to bridge a certain pair of said contacts, a ratchet means including a reciprocal plunger operably connected with said member for moving said member in one direction of rotation into bridging relation with another pair of fixed contacts when said plunger is moved in one direction a predetermined distance from a normal position and a second means operably connected with said first means for moving said member out of bridging relation with said contacts when said plunger is moved in said direction beyond said predetermined distance, said second means being adapted to rotate said bridging member in either direction of rotation to a predetermined position when said plunger is moved in the opposite direction toward said normal position.

References Cited in the file of this patent

UNITED STATES PATENTS

| | | |
|---|---|---|
| 2,283,630 | Hill | May 19, 1942 |
| 2,298,782 | Bluemle | Oct. 13, 1942 |
| 2,496,118 | Brown | Jan. 31, 1950 |
| 2,686,277 | Brodewieck et al. | Aug. 10, 1954 |
| 2,690,481 | Courtney | Sept. 28, 1954 |